2,941,965
FOAMABLE POLYSTYRENE COMPOSITION CONTAINING AN ALIPHATIC HYDROCARBON, A CARBON DIOXIDE LIBERATING AGENT AND BORIC ACID; AND METHOD OF FOAMING

Alvin R. Ingram, Glenshaw, Pa., assignor to Koppers Company, Inc., a corporation of Delaware No Drawing. Filed Nov. 16, 1954, Ser. No. 469,310

14 Claims. (Cl. 260—2.5)

This application is concerned with certain new extrudable expandable polystyrene compositions. It is further concerned with a method for the production of foamed polystyrene having substantially uniform small voids by extrusion on conventional extruding machines.

Presently the commercial production of foamed polystyrene involves utilizing systems wherein the material to be extruded is encased with a pressure system. For example a normally gaseous expanding agent is incorporated under pressure with polystyrene and the foamed material produced by extrusion. It will be realized that the system suffers the disadvantages both as to economy and safety of requiring a pressure system. In the past a variety of expanding agents have been proposed for the production of foamed polystyrene. For example ethylbenzene in combination with steam has been proposed. Normally gaseous agents, such as, for example, methyl chloride have been used as referred to above. The combination of sodium bicarbonate and fatty acids has been proposed.

It is a feature of this invention, that particularly desirable results are obtained by utilization in conventional extrusion equipment of a combination of polystyrene, a normally liquid hydrocarbon, a carbon dioxide liberating agent and boric acid. This combination of polystyrene with the above enumerated three components can be utilized in conventional non-pressurized extrusion equipment to yield foamed polystyrene having substantially uniform small voids. The economic advantage of using conventional extrusion equipment in comparison with pressurized equipment is obvious. Additionally, in utilizing the hereinafter specified amounts of hydrocarbon expanding agent in combination with the boric acid and carbon dioxide liberating agent it is possible to produce foamed polystyrene having minimum quantities of salts incorporated therein and thus the amount of material that might be considered as a contaminant is reduced.

The instant invention comprises a composition comprising polystyrene particles having integrated therewith from about 4½ to 9 percent of an aliphatic hydrocarbon boiling approximately in the range 30°–90° C. homogeneously admixed with a carbon dioxide liberating agent and boric acid in amounts to produce upon reaction a total of from about one-tenth to five percent, based on the polystyrene particles containing the aliphatic hydrocarbon, of a mixture of water and carbon dioxide.

The invention contemplates a method of producing foamed polystyrene having substantially small uniform voids comprising homogeneously admixing polystyrene particles having intergrated therewith from 4½ to 9 percent of an aliphatic hydrocarbon boiling approximately in the range 30°–90° C. with a carbon dioxide liberating agent and boric acid, the latter two substances in amounts to produce upon reaction a total of from about one-tenth to five percent, based on the polystyrene particles containing the aliphatic hydrocarbon, of a mixture of water and carbon dioxide and extruding said admixture in a conventional plastic extrusion machine. It will be realized that the temperature at which the extruder is maintained is dependent upon such variables as the rate of extrusion and the nature of the particular polymer being extruded. It has been found that, in general, extrusion temperatures in the range of from about 280° to 375° F. are satisfactory using the above described compositions of this invention. However, extruder temperatures in the range of approximately 450° F. can be utilized providing the rate of extrusion is increased accordingly.

In computing the amount of boric acid to be utilized in combination with the carbon dioxide liberating agent it is assumed, for the purpose of this invention, that boric acid acts as a monobasic acid, $HBO_2 \cdot H_2O$, akin to metaboric acid plus water.

In a preferred form the compositions of this invention contemplate the utilization of polystyrene particles having from about 6 to 8 percent of an aliphatic hydrocarbon boiling in the range of about 30–70° C., an alkali carbonate or bicarbonate and boric acid in amounts to produce upon reaction a total of from about two-tenths to two percent, based on the polystyrene particles containing the aliphatic hydrocarbon, of a mixture of water and carbon dioxide.

When boric acid and a carbon dioxide liberating agent are utilized in the above set forth quantities, they give compositions which upon extrusion produce polystyrene having substantially uniform small voids and a density less than about five lbs. per cubic foot, which density is particularly desirable in commercial products.

The preferred carbon dioxide liberating agents used herein are the alkali and alkaline earth carbonates and bicarbonates illustrated by such compounds as, for example lithium, sodium, potassium, calcium, strontium, barium, and ammonium carbonates and bicarbonates. Excellent results are obtained by the use of sodium bicarbonate.

It will be realized that the carbonates and bicarbonates of other alkali or alkaline earth metals can be utilized herein. The criterion of acceptability for a carbon dioxide liberating agent useful herein, is the ability of such agent to react with the boric acid at suitable extruder temperatures to yield water and carbon dioxide.

In order to insure the absence of boric acid in the extruded polystyrene it is preferred to use a slight excess of carbon dioxide liberating agent herein.

As used herein the term "conventional" extrusion equipment embraces the various plastic extruders commonly used to extrude polymers of such monomers as, for example, styrene, vinyl and vinylidene chloride, ethylene, acrylonitrile and the like. In these conventional extruders the polymeric material is fed into a hopper which is not pressurized. It is a feature of this invention that the above described extrudable, expandable compositions can be placed in the hoppers of conventional extruders and extruded to produce expanded or foamed polystyrene without making provision for preventing the escape of expanding agent from the hopper as is necessary in the case, for example, of normally gaseous expanding agents.

As has been described before it is possible, utilizing the compositions and methods of this invention, to produce foamed polystyrene having the desirable substantially uniform small voids. The term "small" is used to illustrate the difference between the voids found in commercially available foamed polystyrene and the voids found in foamed polystyrene produced by the method of expansion and the compositions of this invention. The size of the voids in this latter polystyrene is markedly smaller, that is, in the order of one-third or less, than the size of voids found in commercially available foamed polystyrene. The small void size is of course desirable particularly, for example, when the polystyrene is utilized for insulation purposes.

The compositions of this invention can be prepared by starting with styrene polymers which have incorporated substantially uniformly therein an aliphatic hydrocarbon such as, for example, petroleum ether, particularly the pentane and/or hexane fractions. Conveniently polystyrene beads produced by suspension polymerization and into which petroleum ether has been incorporated are utilized. These petroleum ether-containing polystyrene beads are admixed in the dry state with, for example, appropriate amounts of sodium bicarbonate and boric acid. The admixture can be accomplished in conventional dry blending equipment such as, for example, a ribbon blender. This admixture can then be fed to the hopper of a conventional extruder and extruded at a temperature of, for example, approximately 315° F. There is obtained foamed polystyrene having substantially uniform small voids.

As used herein, the terms "percentage" and "parts" are used to indicate percentage and parts by weight unless otherwise indicated.

*Example I*

Polystyrene beads having incorporated therein 6.1 percent petroleum ether (pentane fraction) are admixed on a ribbon blender with 1.34 percent boric acid and 1.82 percent sodium bicarbonate. This mixture is extruded in a conventional plastic extruder at a temperature of 315° F. There is obtained a foamed polystyrene having a density of 2.7 lbs. per cubic foot and having substantially uniform small voids.

Extrusion under similar conditions of the polystyrene containing 7.6 percent by weight petroleum ether (pentane fraction) without admixture with the boric acid and sodium bicarbonate yielded a product having a density in the range 40–50 lbs. per cubic foot.

The coaction of the three elements, that is, petroleum ether, boric acid and carbon dioxide liberating agent is further illustrated by the fact that omission of the petroleum ether from the afore-described composition yields unsatisfactory results. That is, polystyrene containing no petroleum ether which is admixed with 1.34 percent boric acid and 1.82 percent sodium bicarbonate is extruded at a die temperature of 450° F. There is obtained polystyrene having a density in the range 45–55 lbs. per cubic foot. It is to be noted that in the extrusions in which no petroleum ether is present in the mixture it is necessary to operate at a temperature of about 450° C. which is possibly explained by the fact that the presence of petroleum ether in the previously described experiments act as a lubricant for the polystyrene therefore allowing a lower extrusion temperature of 315° F.

It is noted in the foregoing procedure that the respective percentages of boric acid and sodium bicarbonate are calculated to yield 1.74 percent water and carbon dioxide based on the weight of polystyrene containing petroleum ether.

*Example II*

A series of experiments are performed in which boric acid and sodium bicarbonate are utilized and the amounts varied to yield varying percentages of water and carbon dioxide. Polystyrene beads, into which have been incorporated 7.6 percent petroleum ether (pentane fraction) are admixed on a ribbon blender with the below indicated amounts of boric acid and sodium bicarbonate and extruded at a temperature of approximately 315° F. There is obtained foamed polystyrene having substantially uniform small voids of the indicated densities.

| Run No. | Percent Boric Acid | Percent Sodium Bicarbonate | Calculated Percent H₂O and CO₂ | Density, Lbs. per Cu. Ft. |
| --- | --- | --- | --- | --- |
| 1 | 1.54 | 1.82 | 1.74 | 2.70 |
| 2 | 0.38 | 0.45 | 0.43 | 3.15 |
| 3 | 0.19 | 0.23 | 0.22 | 4.30 |

*Example III*

Example II is repeated substituting for the bicarbonate there used an equivalent amount of potassium bicarbonate. Substantially similar results are obtained.

*Example IV*

Example II is repeated substituting for the bicarbonate there used an equivalent amount of sodium carbonate. Substantially similar results are obtained.

*Example V*

Example II is repeated substituting for the bicarbonate there used an equivalent amount of potassium carbonate. Substantially similar results are obtained.

*Example VI*

Example II is repeated substituting for the bicarbonate there used an equivalent amount of calcium carbonate. Substantially similar results are obtained.

It is to be noted that coloring agents can be dry blended with the various above-described components of the compositions of this invention and that upon extrusion there is obtained a colored foamed polystyrene.

Additionally, this invention embraces compositions comprising boric acid and the aforementioned carbon dioxide liberating agents in combination with polystyrene beads having integrated therewith from about four and one-half to nine percent of an aliphatic hydrocarbon, boiling in the range 30–90° C., which beads have been admixed with a highly halogenated non-volatile hydrocarbon and antimony oxide. These polystyrene mixtures can be extruded accordnig to the method of this invention to produce flame-retardant foamed polystyrene. The highly halogenated non-volatile hydrocarbons which are useful are, in general, substances that contain in excess of 50 percent halogen and which boil above 200° C. at atmospheric pressure. These materials are illustrated by such commercially available compounds as Chlorowax 70 and Halowax 1051X. Finely divided antimony oxide which is commercially available is useful herein.

The useful admixtures of aliphatic hydrocarbon containing polystyrene beads, highly halogenated non-volatile hydrocarbon and ethylene oxide are described and claimed in the copending application of John J. Killoran et al., Serial No. 410,761, filed February 17, 1954, now U.S. Patent No. 2,894,918.

While the invention has been described with reference to particular embodiments thereof, it will be understood that in its broadest aspects the invention may be variously embodied within the scope of the invention as set forth herein and in the appended claims.

What is claimed is:

1. A composition capable of being foamed and extruded in one operation comprising polystyrene particles, having integrated therewith from about four and one-half to nine percent of an aliphatic hydrocarbon boiling approximately in the range 30–90° C. homogeneously admixed with a carbon dioxide liberating agent chosen from the class consisting of the ammonium, alkali, and alkaline earth carbonates and bicarbonates and boric acid in amounts to produce upon reaction a total of from about one-tenth to five percent, based on the weight of polystyrene particles containing the aliphatic hydrocarbon, of water and carbon dioxide.

2. A composition capable of being foamed and extruded in one operation comprising polystyrene particles having integrated therewith about 6–8 percent of petroleum ether boiling approximately in the range 30–70° C. homogeneously admixed with a carbon dioxide liberating agent chosen from the class consisting of the alkali and alkaline earth carbonates and bicarbonates and boric acid in amounts to produce upon reaction a total of from about two-tenths to two percent, based on the weight of polystyrene particles containing the petroleum ether, of water and carbon dioxide.

3. A composition of claim 2 in which the carbon dioxide liberating agent is sodium bicarbonate.

4. A composition of claim 2 in which the carbon dioxide liberating agent is potassium bicarbonate.

5. A composition of claim 2 in which the carbon dioxide liberating agent is sodium carbonate.

6. A composition of claim 2 in which the carbon dioxide liberating agent is potassium carbonate.

7. A composition of claim 2 in which the carbon dioxide liberating agent is calcium carbonate.

8. A method of producing foamed, extruded polystyrene having a density not greater than about ten pounds per cubic foot and small uniform voids comprising homogeneously admixing polystyrene particles having integrated therewith from about four and a half to nine percent of an aliphatic hydrocarbon boiling approximately in the range 30–90° C. with a carbon dioxide liberating agent chosen from the class consisting of the ammonium, alkali, and alkaline earth carbonates and bicarbonates and boric acid in amounts to produce upon reaction a total of from about one-tenth to five percent, based on the weight of polystyrene particles containing the aliphatic hydrocarbon, of water and carbon dioxide, and simultaneously foaming and extruding said mixture in a conventional extrusion machine at a temperature in the range of from about 250° to 400° F.

9. The method of producing foamed, extruded polystyrene having a density not greater than about 4.5 lbs. per cubic foot and small uniform voids comprising admixing polystyrene particles having integrated therewith about 6–8 percent of petroleum ether boiling approximately in the range 30–70° C. homogeneously admixed with a carbon dioxide liberating agent chosen from the class consisting of the alkali and alkaline earth carbonates and bicarbonates and boric acid in amounts to produce upon reaction a total of from two-tenths to two percent, based on the weight of polystyrene particles containing the petroleum ether, of water and carbon dioxide, and simultaneously foaming and extruding said admixture in a conventional extruding machine at a dry temperature in the range of about 300–350° F.

10. The method of claim 9 in which the carbon dioxide liberating agent is sodium bicarbonate.

11. The method of claim 9 in which the carbon dioxide liberating agent is potassium bicarbonate.

12. The method of claim 9 in which the carbon dioxide liberating agent is potassium carbonate.

13. The method of claim 9 in which the carbon dioxide liberating agent is sodium carbonate.

14. The method of claim 9 in which the carbon dioxide liberating agent is calcium carbonate.

References Cited in the file of this patent

UNITED STATES PATENTS

| | | |
|---|---|---|
| 1,673,685 | Johnston et al. | June 12, 1928 |
| 2,386,995 | Wigal | Oct. 16, 1945 |
| 2,442,940 | Staudinger et al. | June 8, 1948 |
| 2,478,879 | Ten Broeck | Aug. 9, 1949 |
| 2,576,977 | Stober | Dec. 4, 1951 |
| 2,577,743 | De Long | Dec. 11, 1951 |
| 2,681,321 | Stastny et al. | June 15, 1954 |

FOREIGN PATENTS

| | | |
|---|---|---|
| 743,364 | Great Britain | Jan. 11, 1956 |

OTHER REFERENCES

"Dylite, Expandable Polystyrene," by Koppers Company Inc., copyright 1954, pages 14–16.

"Plastics World," page 4 (March 1954).